T. R. Markillie,
Making Laths.
N° 14,027.  Patented Jan. 1, 1856.
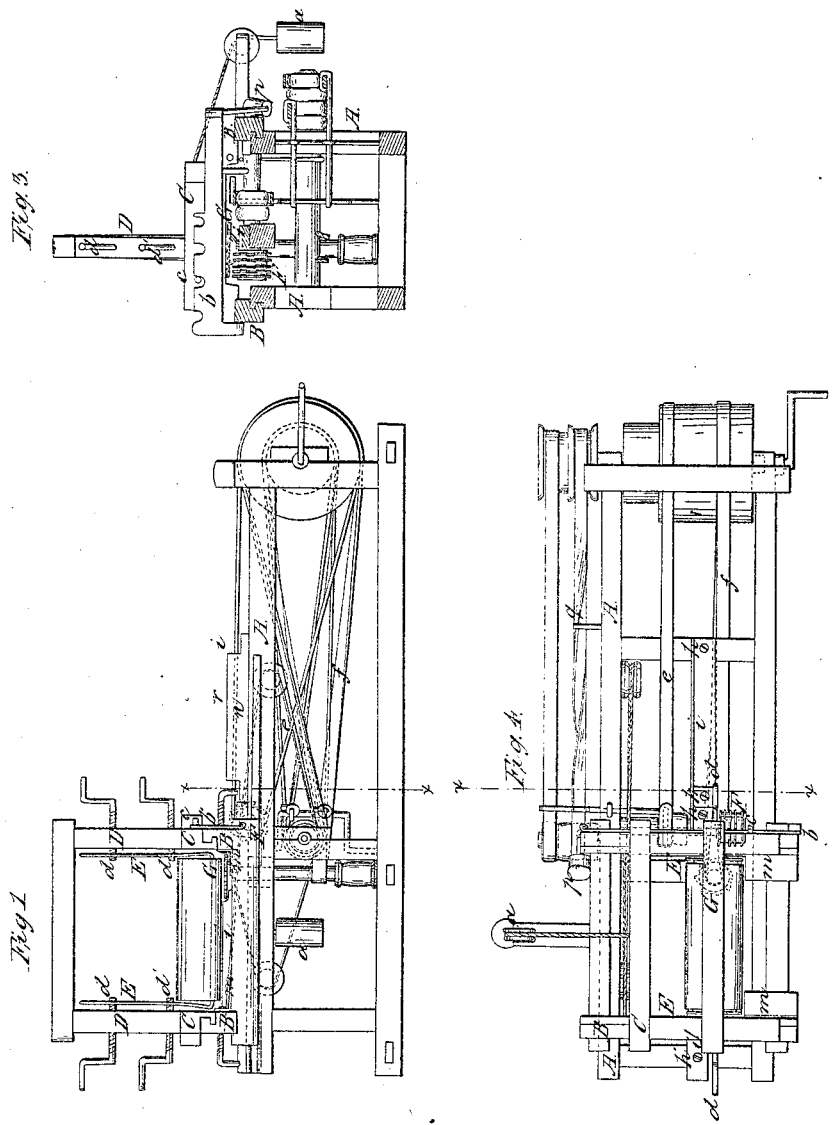

UNITED STATES PATENT OFFICE.

THOS. R. MARKILLIE, OF WINCHESTER, ILLINOIS.

BED FOR LATH-SAWING MACHINES.

Specification of Letters Patent No. 14,027, dated January 1, 1856.

*To all whom it may concern:*

Be it known that I, THOMAS R. MARKILLIE, of Winchester, in the county of Scott and State of Illinois, have invented a new and useful Improvement in Lath-Sawmills; and I do hereby declare that the following is a full, clear, and exact description of the construction and operation of the same, reference being had to the annexed drawing, forming part of this specification, in which—

Figure 1 is a side elevation of the machine. Fig. 2 is a plan of the same; and Fig. 3 is a vertical cross section on line $x$ $x$ of Fig. 2, looking toward carriage.

Similar letters of reference in the several figures denote the same part.

My invention as an improvement in lath sawing machines, refers to those machines in which two systems of saws perpendicular to each other act upon the log.

It is designed to facilitate the setting, and effect the supporting of the log during the operation, so that it may traverse without jar or movement, and at the same time without binding or pressing upon the horizontal saw.

The invention lies in combining with a horizontal bed on the longitudinally traversing carriage, adjustable longitudinal bearing guides upon the main frame, both in front and behind the horizontal saw; so that when the log is set, it shall be incapable of vertical movement, and shall traverse without bearing upon the horizontal saw, the longitudinal bearing guides being adjusted vertically to the required width of lath.

Besides the above combination the invention consists in hanging each of the dogs upon the two screw bolts, one above the other, so that each extremity of the dog may be moved about the attachment of the other extremity to its screw, and both dogs be free to move laterally upon their respective screws; for the purpose of giving the dogs any desired inclination vertically or laterally, to enable them to conform to the inclination of the ends of the log, and thus secure it under all circumstances.

The details of the construction and operation of invention will be understood from the following description and reference to the drawing; where the several parts are thus represented.

A main frame, on which moves the longitudinally traversing carriage. B longitudinally traversing carriage supporting and constituting the guides of the transverse moving dog carriage. C dog carriage—traversing transversely on carriage B by action of weight $a$, whenever the notched plate $b$ is revolved outward to clear the stud $c$. From the horizontal portion of the carriage arise the standards D D. E E dogs—held upon the ends of screw bolts $d$ $d'$, passing through the standard D. By moving either of these screws the extremity of the dog connected therewith is carried with it, causing the dog to assume any desired inclination. The connection of dog and bolts is such as to permit a free movement of the dog horizontally. F gang of vertical saws, rotated by band $e$. G horizontal saw driven by band $f$.

Connected with the main frame A by bolts $h$ $h'$ so as to be adjusted vertically are the longitudinal bearing guides $i$ and $i'$. One, $i$, in front of the horizontal saw G, and the other $i'$ behind it, as shown in Fig. 1. The function of these guides is to support the portion of the log previously cut. Upon the carriage B is the bed $m$ $m$ upon which the uncut portion of the log rests.

As the improvement here considered refers to the setting and supporting of the log only, a detailed description of the operation of the entire machine need not be here given, as the construction claimed is not dependent upon the particular construction of the other portions of the machine. A description of the operation of setting and the action of the features claimed will therefore be all that is necessary to set forth in this connection.

In setting the log, it is made to rest upon the bed $m$ $m$ of the carriage B, and carriage C being drawn over it the dogs E E are secured to its ends by means of screws $d$ $d'$, so that the face of the dogs shall take the direction of the respective ends of the log, and thus hold it firmly, and beyond the possibility of vertical movement. The carriage B at this time being to the right of saws F. It should be stated in this connection that the inner vertical face of the log is made to rest against the face $n$ of guide $i$. When the log is thus set, the carriage C is held in position by plate $b$, as shown in Fig. 3. The log being thus set the carriage B is made to traverse over the saws, by which operation the first cut is effected. The movement of the carriage is then reversed, and when weight $p$ strikes stud $q$, plate $b$ is revolved outward, permitting carriage C to be moved by weight $a$ until the vertical face of the cut comes in contact with face $n$ of guide $i$, the horizontal face of the cut passing upon the edge $r$ of said guide, and thus causing the log to rest upon bed $m\ m$ and the guide $i$, plate $b$ falling into position to hold carriage C. At the next movement of the carriage B over the saws the second cut is made, the horizontal face of the previous cut passing upon the bearing guide $i'$ behind the horizontal saw and thus rendering that saw entirely free from the pressure of the log. When the cut is completed and the carriage gigs back the horizontal saw is relieved from the pressure of the log by the action of the bearing gauges $i$ and $i'$. When the log has been cut entirely through, the carriage C is drawn forward so as to bring the log over bed $m\ m$, and the dogs E gradually removed from the ends of the log so as to permit it to fall gently upon the said bed, where it was first placed. It is then again secured as before described and the sawing operation recommenced with the same results as above set forth. The operation is thus continued until the log is entirely disposed of. The bed $m\ m$ on carriage B and the bearing guides $i\ i'$ by securing the log vertically, prevent any jar or movement thereof, and the conformable dogs E E are advantageous in the setting of logs with oblique ends, and moreover in the facility which they give to the letting of the log gradually to the bed $m\ m$ for setting. The function of the bearing guide $i'$ in keeping the log from bearing on the saw, is of the utmost importance, and thus contributes more to the effectual operation of the machine than any other feature of the invention.

Having thus described my invention and the operation thereof, I disclaim the employment of the two systems of saws perpendicular to each other, such forming no part of my invention.

What I claim is—

1. The combination of the bed $m\ m$ with the longitudinal bearing guides $i\ i'$ arranged and operating as, and for the purposes set forth.

2. Also the construction of the conformable dogs E, operating as, and for the purposes set forth.

THOS. R. MARKILLIE.

Witnesses:
GEO. PATTEN,
JAS. D. CLARY.